United States Patent [19]
Kubo et al.

[11] Patent Number: 5,164,791
[45] Date of Patent: Nov. 17, 1992

[54] MINUTE DISPLACEMENT DETECTOR USING OPTICAL INTERFEROMETRY

[75] Inventors: Keishi Kubo, Moriguchi; Tatsuo Itou, Osaka, both of Japan

[73] Assignee: Matsushita Electric Industrial Co., Ltd., Osaka, Japan

[21] Appl. No.: 664,623

[22] Filed: Mar. 4, 1991

[30] Foreign Application Priority Data

Mar. 7, 1990 [JP] Japan .................................. 2-55327

[51] Int. Cl.$^5$ ............................................. G01B 11/02
[52] U.S. Cl. .................................... 356/356; 356/358; 356/345; 250/306; 250/227.19
[58] Field of Search ............... 356/356, 354, 358, 345, 356/373, 375, 376, 381, 382, 380; 250/231.14, 231.18, 307, 306, 308, 227.19, 227.27

[56] References Cited
U.S. PATENT DOCUMENTS

| | | | |
|---|---|---|---|
| 5,011,287 | 4/1991 | Mino | 356/356 |
| 5,017,010 | 5/1991 | Mamin et al. | 356/345 |

OTHER PUBLICATIONS

Atomic Force microscopy using optical interferometry Erlandsson et al–Journal of Vac. Sci. Technol.–vol. 6, No. 2 Mar./Apr. 1988–pp. 266-270.
A differential interferometer for force microscopy Schönenberger et al.–Rev. of Sci. Instrum. (60)(10) Oct. 1989–pp. 3131-3134.

Primary Examiner—Samuel A. Turner
Assistant Examiner—LaCharles P. Keesee, II
Attorney, Agent, or Firm—Wenderoth, Lind & Ponack

[57] ABSTRACT

A displacement detector device has a source of laser beam; a diffraction grating for separating the laser beam into a plurality of beam components; a filter for shielding the beam components other than the two beam components of ± primary order produced by the diffraction grating; a wavelength plate operable to vary the polarized state of one of the two beam components of ± primary order; a lens element for focusing the two beam components of ± primary order on a displacement plane and a reference plane, respectively; and a photosensor. The two beam components of ± primary order focused on the reference and displacement planes, respectively, are subsequently reflected therefrom and are then collimated by the lens element after having again entered the lens element in substantially overlapped relationship. The two beam components emerging from the lens element are again diffracted by the diffraction grating, and the photosensor detects an interfering component of the beam components of primary order.

3 Claims, 2 Drawing Sheets

MINUTE DISPLACEMENT DETECTOR USING OPTICAL INTERFEROMETRY

BACKGROUND OF THE INVENTION

1. Field of the Invention

The present invention generally relates to an apparatus for measuring a surface profile by the utilization of interatomic forces acting between a probe and a surface to be measured and, more particularly, a displacement detector adapted to measure a minute displacement of the probe over a distance on the order of a nanometer, which would result from a change in interatomic force acting between the probe and the surface, and also for the measurement of a minute displacement of the probe on a stroke in the order of micrometer.

2. Description of the Prior Art

As a means for measuring a minute surface profile, the method has been well known in the art, which comprises the steps of detecting an interatomic force acting between a sample surface to be measured and a sharp-pointed probe spaced a slight distance from the sample surface, moving the sample surface relative to the probe in a direction perpendicular to the probe, while the probe and the sample surface are spaced from each other a distance in the order of nanometer so that the detected interatomic force can attain a constant value, and scanning the position of the sample surface in a direction parallel to the probe thereby to accomplish a surface profile measurement. According to this known method, the interatomic force acting between the probe and the sample surface is required to be of a constant value in order for the distance between the sample and the probe to be maintained at a constant value and, for the detection of this interatomic force, the amount of deviation of the probe, supported by a spring, which would occur under the influence of the interatomic force is detected to determine the distance between the probe and the sample surface. In this type of surface profile measuring apparatus, demands have been made for it to have a capability of measuring the displacement of the probe to the accuracy of a nanometer or smaller.

The prior art displacement detector embodying the above described method will now be discussed with reference to FIG. 3 of the accompanying drawings.

Referring to FIG. 3, the prior art displacement detector comprises a polarizing beam splitter 101, $\lambda/4$ wavelength plates 102 and 103, an optical lens 104, a probe 105 supported by a holder in a cantilever fashion and having a displacement plane, a mirror 106 defining a reference plane, polarizing plates 107 and 110, sensors 108 and 111 and a beam splitter 109.

The prior art displacement detector of the above described construction operates in the following manner.

Laser beams of first and second frequencies slightly different from each other, which have been linearly polarized in respective directions perpendicular and parallel to the plane of the drawing enter the beam splitter 109. The laser beams entering the beam splitter 109 are divided into first and second laser beam components. The first laser beam components of the laser beams of the first and second frequencies travel towards the polarizing plate 110 through which only respective beam components polarized at 45 degrees relative to the plane of the drawing are allowed to pass therethrough. The polarized beam components enter the photosensor 111 which subsequently generates a reference signal indicative of a beat frequency between the first and second frequencies.

The second laser beam components emerging from the beam splitter 101 travel towards the polarizing beam splitter 101 and are divided by the polarizing beam splitter 101 into first, second and third polarized beam components. The first polarized beam component, polarized in a direction parallel to the plane of the drawing, travels, as a reference beam, towards the mirror 106 through the $\lambda/4$ wavelength plate 103 and is then reflected by the mirror 106 so as to travel backwardly towards the photosensor 108 again through the $\lambda/4$ wavelength plate 103, then through the polarizing beam splitter 101 and finally through the polarizing plate 107. During the passage of the first polarized beam component, which has been reflected by the mirror 106, through the $\lambda/4$ wavelength plate 103, the first polarized beam component is polarized at an angle of 90 degree.

The second polarized beam component, polarized in a direction perpendicular to the plane of the drawing during the passage thereof through the polarizing beam splitter 101, is directed, as a displacement beam, towards the probe 105 through the $\lambda/4$ wavelength plate 102 and then through the lens 104 and is subsequently reflected by the displacement plane of the probe 105 so as to travel backwardly towards the polarizing beam splitter 101 through the lens 104 and then through the $\lambda/4$ wavelength plate 102. The second polarized beam component reflected from the displacement plane of the probe 105 is polarized 90 degree during the passage thereof through the $\lambda/4$ wavelength plate 102 and subsequently enters the polarizing beam splitter 101 which serves to reflect it so as to travel towards the photosensor 108 through the polarizing plate 107.

The beat due to the difference in frequency between the reference beam reflected by the mirror 106 and the displacement beam reflected by the probe 105 is detected by the photosensor 108. When the probe displaces, the length of the optical path for the displacement beam varies correspondingly and the difference in length between the optical path for the displacement beam and that for the reference beam is outputted in the form of a change in phase of a beat signal detected by the photosensor 108. By determining the difference in phase between the beat signal and the beat signal detected by the photosensor 111, the amount of displacement of the probe can be detected.

The prior art displacement detector of the above described construction has a problem in that, since the position used as a reference for the measurement of the position of the probe 105 is represented by the mirror 106, an erroneous detection in position of the probe tends to occur when the mirror 106 vibrates under the influence of, for example, an external disturbance. It also has another problem in that, since the optical paths along which the reference beam and the displacement beam travel, respectively, differ from each other, the measurement is apt to be adversely affected by a change in ambient temperature and/or ambient pressure and also by a change in refractive index resulting from a change in temperature.

SUMMARY OF THE INVENTION

The present invention has been devised with a view to substantially eliminating the above discussed problems and has for its essential object to provide an improved displacement detector effective to accomplish an accurate measurement without being adversely affected by any external disturbance such as, for example, a change in refractive index of the air.

To this end, the present invention provides a detector for detecting a minute displacement, which comprises a source of a laser beam; a diffraction grating for separating the laser beam into a plurality of beam components; a filter means for filtering out the beam components other than the two beam components of ± primary order produced by the diffraction grating; a wavelength plate operable to vary the polarized state of one of the two beam components of ± primary order; a lens element for focusing the two beam components of ± primary order on a displacement plane and a reference plane, respectively; and a photosensor means.

The two beam components of ± primary order focused on the reference and displacement planes, respectively, are subsequently reflected therefrom and are then collimated by the lens element after having again entered the lens element in substantially overlapped relationship. The two beam components emerging from the lens element are again diffracted by the diffraction grating, and the photosensor means detects an interfering component of the beam components of primary order.

According to another aspect of the present invention, the source of laser beams may emit laser beams of first and second frequencies slightly different from each other. Also, use is made of a phase detector for detecting a difference in phase between a beat signal outputted from the photosensor means and a beat signal emitted by the laser beam source.

According to the present invention, the reference plane can be defined in the vicinity of the displacement plane and, therefore, any adverse influence which may be exerted on the measurement accuracy by an external disturbance can be advantageously avoided thereby making it possible to accomplish a highly precise displacement measurement. In addition, the path along which the reference signal travels and that along which the displacement signal travels are substantially identical and, therefore, both the reference beam and the measurement beam receive equal influence of a change in refractive index of the air. Thus, the change in refractive index can be advantageously compensated for thereby to accomplish a highly precise measurement of minute displacement.

BRIEF DESCRIPTION OF THE DRAWINGS

These and other objects and features of the present invention will become clear from the following description taken in conjunction with the accompanying drawings, in which.

DETAILED DESCRIPTION OF THE EMBODIMENTS

Figure 1:
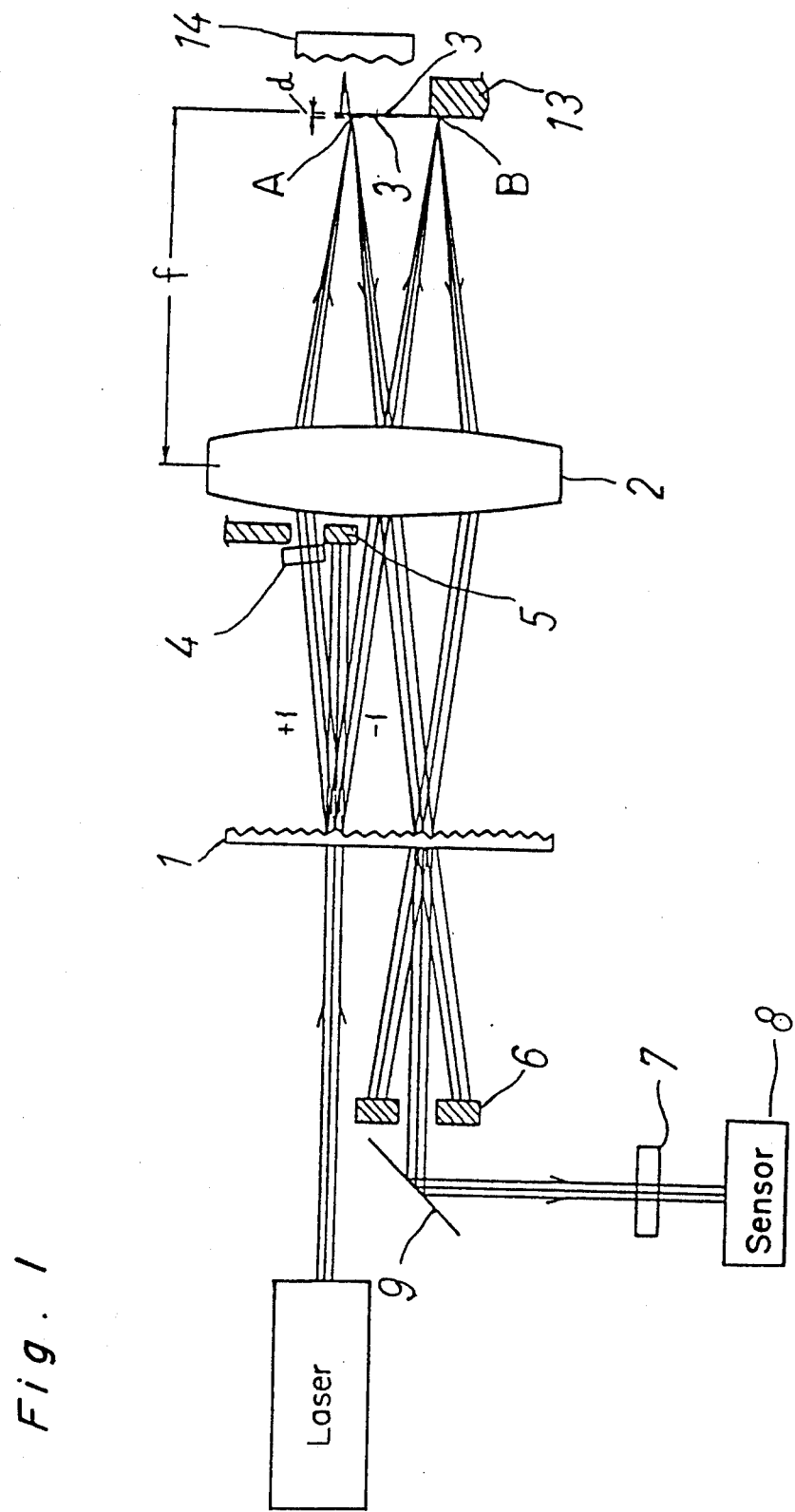
FIG. 1 is a schematic diagram showing a displacement detector according to a first preferred embodiment of the present invention.

Referring first to FIG. 1, a displacement detector according to a first preferred embodiment of the present invention comprises a diffraction grating 1, a lens 2 disposed in face-to-face relationship with the diffraction grating 1, a probe 3 supported by a holder 13 in a cantilever fashion and spaced from the lens 2 a distance equal to the focal length f of the lens 2, a λ/4 wavelength plate 4, first and second filters 5 and 6, a polarizing plate 7, a photosensor 8 and a reflecting mirror 9. Reference numeral 14 designates a sample surface to be measured.

A laser beam emitted from a He-Ne laser (not shown) and linearly polarized in a direction at an angle of 45 degrees relative to the plane of the drawing travels towards and passes through the diffraction grating 1. Beam components diffracted by and emerging from the diffraction grating 1, other than those of ± primary order, are blocked by the filter 5.

Of the diffracted beam components of ± primary order emerging from the diffraction grating 1, the beam component of + primary order is rotationally polarized by the λ/4 wavelength plate 4 and is then, after having been condensed by the lens 2 on a displacement plane A defined on the probe 3, reflected therefrom so as to pass again through the lens 2. The reflected beam component of + primary order is collimated during its passage through the lens 2 and is subsequently again diffracted by the diffraction grating 1. The filter 6 positioned on the side of the diffraction grating 1 opposite to the lens 2 serves from allow the passage of only a diffracted beam component of + primary order which is subsequently projected onto the photosensor 8 after having been deflected by the mirror 9 and subsequently passed through the polarizing plate 7.

On the other hand, the diffracted beam component of − primary order emerging from the diffraction grating 1 is, after having been condensed by the lens 2 onto a reference plane B defined on the probe holder 13, reflected backwardly towards the lens 2 and is again diffracted by the diffraction grating 1 after having been collimated by the lens 2. Only the beam component of − primary order emerging from the diffraction grating 2 is permitted to pass through the filter 6 and subsequently reaches the photosensor 8 after having been deflected by the mirror 9 and subsequently passed through the polarizing plate 7.

The diffraction grating 1 is so arranged and so positioned that the beam component reflected from the displacement plane A and the beam component reflected from the reference plane B will substantially overlap with each other in the diffraction grating 1. Also, the arrangement is such that the twice diffracted beam components of ± primary order will travel along the same path whereby the beam components filtered by the filter 6 will enter the photosensor 8 after having been deflected by the mirror 9 and subsequently passed through the polarizing plate 7, allowing the photosensor 8 to generate a displacement signal indicative of the magnitude of displacement of the probe 3.

Specifically, the intensity of the displacement signal outputted by the photosensor 8 varies sinusoidally according to the difference in optical path length along which the two diffracted beam components of ± primary order travel from the diffraction grating 1 towards the displacement and reference planes A and B and then back towards the diffraction grating 1. Therefore, by rotating the polarizing plate 7 so that the output from the photosensor 8 can match with the point of origin of the sine wave as a result of displacement of the probe 3, a minute displacement of the probe 3 in a quantity equal to or smaller than the λ/4 wavelength of the laser beam can be detected approximately in proportion to the intensity of the signal detected by the photosensor 8.

According to the foregoing embodiment of the present invention, the reference plane B providing a reference for the detection of the displacement of the probe 3 is provided in the vicinity of the probe 3 itself and, therefore, the precise measurement will not be adversely affected by any external disturbance of the reference plane B which does not also affect the probe 3 itself, making it possible to accomplish a highly precise detection of a minute displacement. Also, since the reference signal and the displacement signal travel along substantially the same path and both the reference beam and the measurement beam are equally affected by, for example, a change in refractive index of the air, any change in refractive index can be compensated for thereby to make it possible to accomplish a highly precise measurement of the minute displacement.

Figure 2:
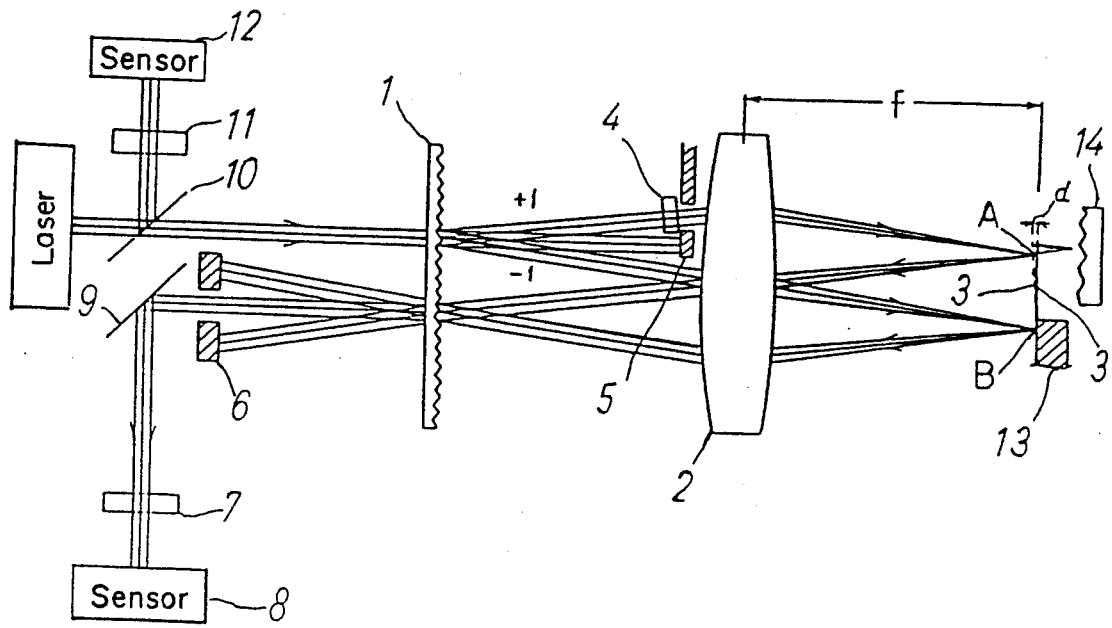
FIG. 2 is a diagram similar to FIG. 1, showing the displacement detector according to a second preferred embodiment of the present invention.
Figure 3:
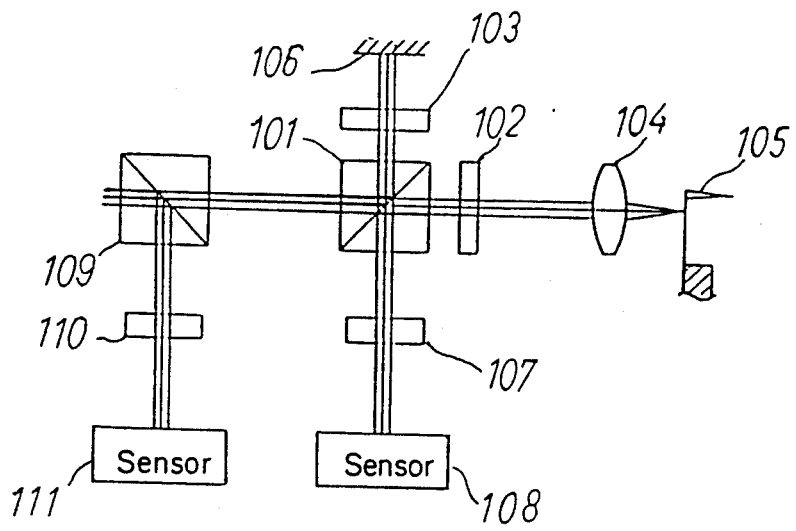
FIG. 3 is a schematic diagram showing a prior art displacement detector.

Referring now to FIG. 2 showing a second preferred embodiment of the present invention, the displacement detector shown therein comprises a diffraction grating 1, a lens 2 disposed in face-to-face relationship with the diffraction grating 1, a probe 3 supported by a holder 13 in a cantilever fashion and spaced from the lens 2 a distance equal to the focal length f of the lens 2, a $\lambda/2$ wavelength plate 4, first and second filters 5 and 6, polarizing plates 7 and 11, photosensors 8 and 12, a reflecting mirror 9, and a beam splitter 10. Reference numeral 14 designates a sample surface to be measured.

The displacement detector according to the second preferred embodiment of the present invention operates as follows.

Laser beams of respective frequencies slightly different from each other emitted from a He-Ne laser (not shown) and linearly polarized in respective directions perpendicular to and parallel to the plane of the drawing enter the beam splitter 10 by which they are divided into first and second beam components. The first beam components of the different frequencies travel towards the photosensor 12 through the polarizing plate 11 which serves to polarize the incoming beam components at an angle of 45 degrees relative to the plane of the drawing. The photosensor 12 upon receipt of the first beam components provides a reference signal indicative of the beating of the difference in frequency between the laser beams from the laser beam source.

On the other hand, the second beam components of the different frequencies emerging from the beam splitter 10 are transmitted to the diffraction grating 1 from which second beam components emerge. The filter 5 serves to allow the passage therethrough of only the diffracted beam component of ± primary order.

Of the second beam components of ± primary order emerging from the diffraction grating 1, the beam component of + primary order is passed through the wavelength plate 4 by which the plane of polarization is varied 90 degrees, and is, after having been condensed by the lens 2 on a displacement plane A defined on the probe 3, reflected therefrom so as to pass again through the lens 2. The reflected beam component of + primary order is collimated during its passage through the lens 2 and is subsequently again diffracted by the diffraction grating 1. The filter 6 positioned on the side of the diffraction grating 1 opposite to the lens 2 serves from allow the passage of only a diffracted beam component of + primary order which is subsequently projected onto the photosensor 8 after having been deflected by the mirror 9 and subsequently passed through the polarizing plate 7.

On the other hand, the diffracted beam component of − primary order emerging from the diffraction grating 1 is, after having been condensed by the lens 2 onto a reference plane B defined on the probe holder 13, reflected backwardly towards the lens 2 and is again diffracted by the diffraction grating 1 after having been collimated by the lens 2. Only the beam component of − primary order emerging from the diffraction grating 2 is permitted to pass through the filter 6 and subsequently reaches the photosensor 8 after having been deflected by the mirror 9 and subsequently passed through the polarizing plate 7.

The diffraction grating 1 is so arranged and so positioned that the beam component reflected from the displacement plane A and the beam component reflected from the reference plane B substantially overlap with each other in the diffraction grating 1. Also, the arrangement is such that the twice diffracted beam components of ± primary order travel along the same path, and only portions of the beam components which are filtered through the filter 6 and then polarized by the polarizing plate 7 so as to travel in respective planes parallel and perpendicular to the plane of the drawing are allowed to reach the photosensor 8 so that the photosensor 8 can generate a displacement signal indicative of the beating of the difference in frequency between the laser beams. The phase of the beat of the displacement signal varies with a difference in optical path length along which the two diffracted beam components of ± primary order travel from the diffraction grating 1 towards the displacement and reference planes A and B and then back towards the diffraction grating 1.

The displacement of the probe 3 can be detected in terms of a phase angle by comparing the beat of the displacement signal, detected by the photosensor 8, with the beat of the reference signal detected by the photosensor 12 with the use of a phase detector (not shown).

According to the foregoing second preferred embodiment of the present invention, the reference plane B providing a reference for the detection of the displacement of the probe 3 is provided in the vicinity of the probe 3 and, therefore, the precise measurement will not be adversely affected by any external disturbance, making it possible to accomplish a highly precise detection of a minute displacement. Also, since the reference signal and the displacement signal travel along substantially the same path and both of the reference beam and the measurement beam are equally affected by, for example, a change in refractive index of the air, any change in refractive index is compensated for thereby to make it possible to accomplish a highly precise measurement of the minute displacement. Again, since the detection of the displacement is accomplished in terms of the difference in phase of the beat signal, not a change in intensity of the signal, a minute displacement can be highly precisely detected without being adversely affected by any change in intensity of the signal.

It is to be noted that, although in describing either of the first and second preferred embodiments of the present invention, reference has been made to the use of the He-Ne laser as the source of the laser beams, any other laser source may be employed in the practice of the present invention.

From the foregoing description of the present invention, it is clear that an optical system for the displacement detector is comprised of the diffraction grating, the filters and the lens, the reference plane can be defined in the vicinity of the displacement plane and, therefore, any adverse influence which may be exerted on the measurement accuracy by an external disturbance can be advantageously avoided thereby making it possible to accomplish a highly precise displacement measurement. It is also clear that, since the path along which the reference signal travels and that along which the displacement signal travels are substantially identical allowing both the reference beam and the measurement beam to be equally influenced by a change in refractive index of the air, the change in refractive index can be advantageously compensated for thereby to accomplish a highly precise measurement of minute displacement.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A displacement detector device comprising:
   a laser beam source;
   a diffraction grating in the path of a laser beam emitted from said laser beam source for separating the laser beam into a plurality of beam components;
   a filter means directly in the path of the beam components from said diffraction grating for shielding the beam components other than the ± primary order beam components produced by the diffraction grating;
   a wavelength plate in the path of one of the primary order beam components and operable to vary the polarized state of the one primary order beam component;
   a displacement detector having a reflective displacement plane movable as the detector moves for carrying out displacement detection and having a reflective fixed reference plane immediately adjacent said displacement plane;
   a lens element between said filter means and said displacement detector directly in the path of the primary order beam components and positioned for focusing the primary order beam components directly on the respective planes of said displacement detector and for directly receiving the primary order beam components reflected from the respective planes and collimating them and directing them to a position on said diffraction grating where they overlap; and
   a photosensor on the opposite side of said diffraction grating from said lens element for receiving from said diffraction grating the overlapped +primary order beam component from one of said planes and the −primary order beam from the other of said planes and producing therefrom an output indicative of the difference in position between said planes.

2. A displacement detector as claimed in claim 1 in which said laser source is a laser source for emitting a single laser beam, and said photosensor comprises means for detecting the intensity of the overlapped primary order beam components.

3. A displacement detector as claimed in claim 1 in which said laser source is a laser source for emitting two laser beams of slightly differing frequencies, and said photosensor comprises means for detecting a beat signal of the overlapped primary order beam components, said displacement detector further comprising a further photosensor for receiving the laser beams emitted from said laser source and detecting a beat signal of the laser beams from said laser source, and a phase detector for detecting the difference between said beat signals.

* * * * *